April 13, 1937.　　　H. LEDWINKA　　　2,076,653
INTERNAL COMBUSTION ENGINE
Filed Nov. 26, 1934　　　2 Sheets-Sheet 1

INVENTOR
HANS LEDWINKA.
BY
ATTORNEYS

April 13, 1937.     H. LEDWINKA     2,076,653
INTERNAL COMBUSTION ENGINE
Filed Nov. 26, 1934     2 Sheets-Sheet 2
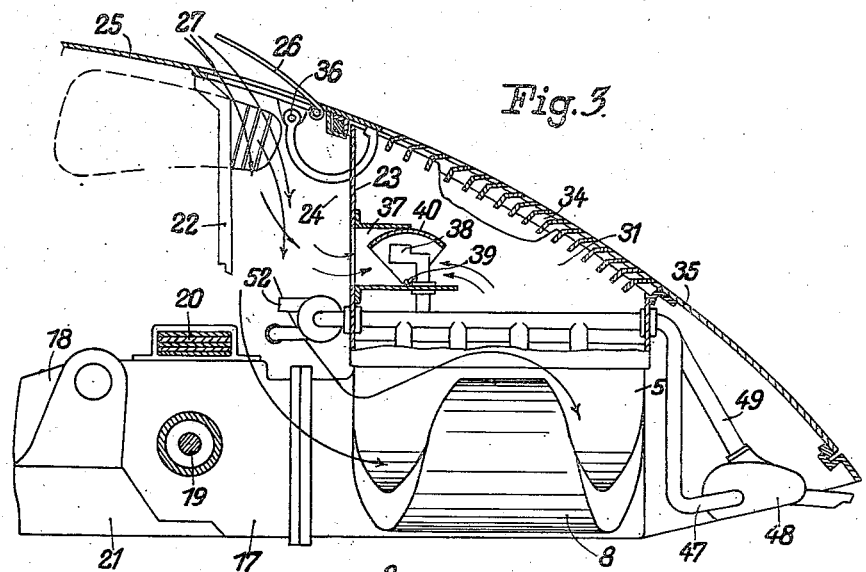
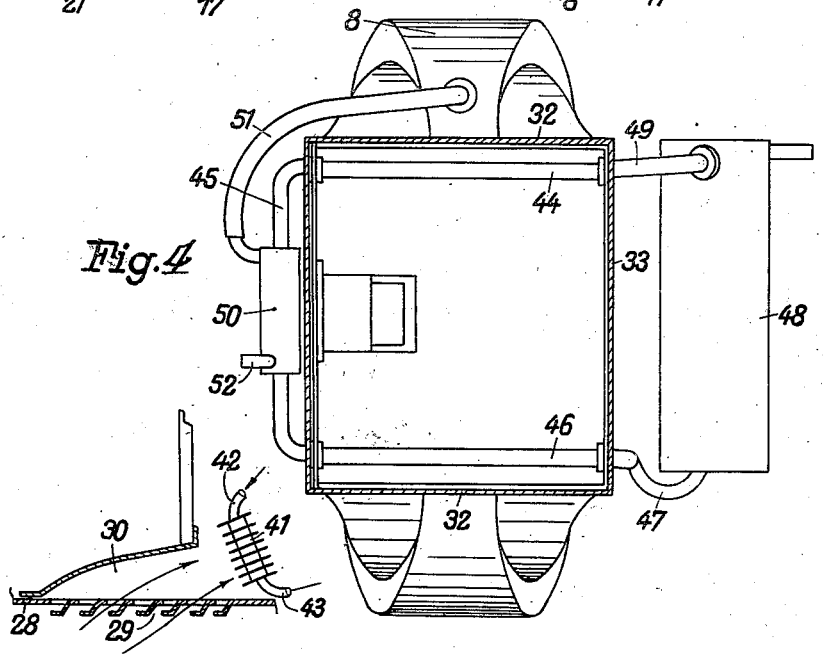
INVENTOR
HANS LEDWINKA.
BY
ATTORNEYS Patented Apr. 13, 1937

2,076,653

UNITED STATES PATENT OFFICE 2,076,653

INTERNAL COMBUSTION ENGINE

Hans Ledwinka, Koprivnice, Czechoslovakia

Application November 26, 1934, Serial No. 754,760
In Germany September 13, 1933

1 Claim. (Cl. 123—171)

This invention relates to an internal combustion engine having two rows of cylinders being connected with the crank case and being arranged in V-formation and more particularly to the air cooling of such an engine.

The cooling of a multi-cylinder internal combustion engine with air always gives rise to considerable difficulty owing to the large quantity of air required and to the necessity for the air to be distributed over the entire surface of the cylinders. This is the case particularly with engines having a plurality of cylinders arranged in a row or in a plurality of adjacent rows, for example, in the case of cylinders arranged in V or star formation.

These disadvantages are obviated, in accordance with the invention, in the case of engines with the cylinders arranged in V-formation by providing a blower or a series of blowers at both sides of the engine substantially below the cylinders, each of the two blowers or each of the two rows of blowers cooling the adjacent row of cylinders and the air being conducted away, preferably upwardly, substantially between the two rows of cylinders. The axes of the blowers or rows of blowers are arranged parallel to the axis of the crank-shaft of the engine. The blowers are preferably driven either from the crank-shaft itself or from the cam-shaft gearing, for example from the tensioning roller of the cam-shaft chain drive.

With the arrangement of the cooling air blowers and air supply in accordance with the invention, the current of air can be distributed without difficulty over the entire surface of the cylinders including the cylinder heads and the air flows at right angles to the axes of the cylinders, so that the cooling ribs can also be arranged at right angles to the axes of the cylinders which is particularly advantageous for casting purposes. The exhaust pipe is only swept by the air which is withdrawn and is thereby cooled and it cannot transfer heat to the air before the air impinges on the cylinders. The pipe for supplying the combustible mixture which is arranged between two rows of cylinders and the down-flow carburetor arranged above the engine, which is usually employed in V-engines, are located in a warm current of air which is withdrawn, so that special arrangements for heating them are unnecessary. The work of the blower is assisted owing to the upward flow of the upwardly directed current by the natural rise or chimney effect of the heated air. In spite of the fact that two blowers or rows of blowers are employed, the total structural length of the engine can be shorter than an engine having a single blower arranged at the end of the crank-shaft and further the engine or its most important parts are more accessible. The fact that the width of the engine or of its lower part is somewhat larger than that of the known constructions is no disadvantage since the space occupied by the blowers is not generally used for another purpose, in particular with the arrangement of the engine between the rear wheels which are driven but not steered, such as has lately come to the fore for power vehicles.

A further advantage of the construction in accordance with the invention is that several blowers for each row of cylinders, or in some cases a blower for each cylinder, can be arranged on one and the same shaft, in which case the direction of rotation of the wheels of the blower is so arranged that a deflection of the current of air which is delivered is not necessary as in the known arrangements. The employment of a corresponding number of blowers at the end of the engine would result in its length being excessive.

A further feature of the invention consists in that a blower, preferably a Duplex blower, viz. a blower having air inlet openings and two series of fan blades and channels for conducting the compressed air arranged symmetrically of a central plane disposed vertically of the drive shaft, supplies the cooling air to several cylinders of the row of cylinders beside which it is arranged, in which case the blower is preferably arranged approximately in the centre between the cylinders which it supplies with cooling air. The two series of fan blades are arranged on opposite sides of the disk of the blower wheel. The advantage of this particular arrangement lies in its great simplicity and cheapness as well as in the small amount of space occupied.

With the blower arrangement which has been described, in accordance also with the invention, the cooling air can be employed also for cooling the engine oil, namely by compelling a suitable amount of cooling air to come into contact with parts which conduct the heat away from the oil. The heat-conducting parts can be formed either by the side or bottom walls of the crank case or gear casing or by suitably arranged oil conduits which may be made, if desired, in the form of coolers.

Further features of the invention will appear from the following description and accompanying drawings in which various constructional embodiments of the invention are illustrated by way of example. In the drawings:—

Figure 3 illustrates the rear part of an engine built into a stream-lined vehicle, the engine being constructed substantially in accordance with Figures 1 and 2, and Figure 4 is a partial elevation of the engine shown in Figure 3 and shows details of the vehicle body in plan, certain parts being in section.

Figure 1:
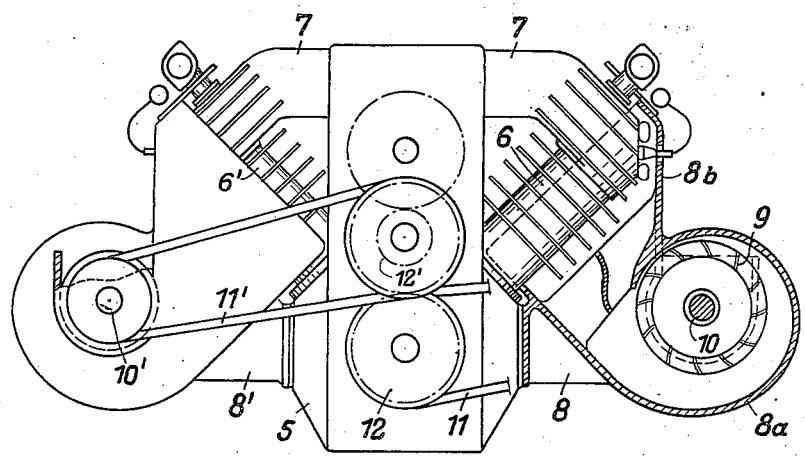
Figure 1 shows an end elevation of the engine.
Figure 2:
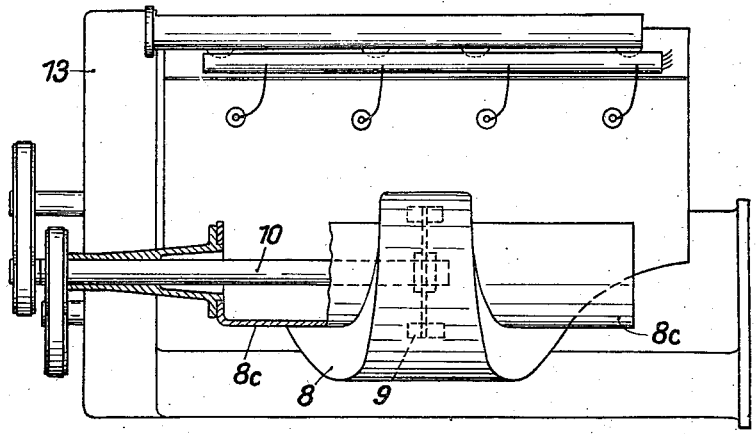
Figure 2 is a side elevation of the same engine.

In Figures 1 and 2, the two rows of cylinders 6 and 6' are connected in V-formation with the engine casing 5 and the casings 7 containing the valve controlling members are arranged between the rows of cylinders. The fan or blower casings 8 and 8' are fitted to the engine casing 5 below the cylinders 6 and 6'. As may be seen from Figure 2, only a single fan or blower casing is provided on each side of the engine approximately in the middle of the rows of cylinders and the casing is provided on both sides with suction inlets and contains a double acting blower or fan wheel 9. To the part 8a of the casing 8 which surrounds the wheel 9 is connected a widened casing part 8b which almost entirely surrounds the cylinders on one side and distributes the current of cooling air. In order that the air may be drawn-in from above, partitions 8c are provided at both sides of the suction inlets of the actual fan casing 8a, which partitions may at the same time act as the bearings for the shaft 10 of the fan or blower. The wheel 9 of the fan or blower and the casing are constructed and arranged in such a manner that the air flows out of the lower part of the casing and moves from below upwardly over the cylinders without having to change its direction of motion. The blades of the blower or fan wheels on the sides facing the cylinders therefore move upwardly.

Belts 11 and 11' are provided for driving the two blower shafts 10 and 10'. The two shafts 10 and 10' are rotated in opposite directions in a simple manner by providing the driving wheel 12 for the belt 11 and the driving wheel 12' for the other belt 11' each with one of two toothed wheels which also serve to drive the cam shaft located above them and are fitted in the casing 13. The driving wheel or pulley 12' can then be arranged on the first toothed wheel of the driving gear for the cam shaft, or on the tensioning roller for the chain which drives the cam shaft and the driving wheel or pulley 12' can be arranged on the cam shaft.

In the arrangement of the engine shown in Figures 3 and 4, the engine casing 5 is flanged to the rear side of the casing 17 of the driving gear, in front of the front side of which the change speed gear casing 18 is located, and to which the wheels are connected preferably through the agency of floating half shafts and axles 19 so as to be movable upwardly and downwardly independently one of the other and supported by a transverse spring 20. The driving unit consisting of the engine, driving gear, change speed gear, and axles, wheels and springs is fitted in a suitable manner at the rear end of the frame or chassis 21.

An air suction shaft 24 is formed by a transverse partition 22, which shuts off the passenger space in the body of the vehicle, and by a second transverse partition 23. This shaft 24 is open to the atmosphere by means of openings 27 which are provided in the upper wall 25 of the body of the vehicle and can be closed by flaps 26 as well as by slots 29 provided in the side walls 28 of the body of the vehicle and additional air passages 30. The engine 5 then draws the cooling air through the aforesaid openings and the shaft 24 by means of the blowers 8 arranged on both sides of it, the air being conducted below the lower edge of the rear partition 23. The air is then conveyed upwardly by the blowers 8 past the surfaces to be cooled, in particular the cylinders, into a shaft 31 which is formed by the partition 23, the side walls 32 and a rear wall 33. The bottom of this shaft is connected to the engine casing and the top is covered by an outlet grid 34 provided in the top wall of the body of the vehicle. The portion 35 of the rear part of the upper wall of the body of the vehicle which contains the outlet grid 34 can be swung upwardly about a forwardly situated hinge or pivot 36 for the purpose of obtaining access to the engine.

In the partition 23 between the air inlet shaft 24 and the air outlet shaft 31 there is provided a connecting passage 37 in which the suction opening for the carburetor, or the entire carburetor 38, is located. The opening of the connecting passage 37 leading to the inlet shaft 24 or the opening leading to the outlet shaft 31 can be opened and closed, as desired, by means of a member or flap 40 which can swing about a pivot 39 located below it. In cold weather the opening of the passage 37 leading to the inlet shaft is closed by means of the flap 40 and the carburetor is, therefore, compelled to receive the pre-heated air for combustion from the outlet shaft 31, whereas, conversely, in hot weather the opening of the passage 37 leading to the outlet shaft 31 is closed and the carburetor is compelled to draw-in cool and not pre-heated air from the suction shaft 24.

At the place where the auxiliary lateral passage 30 enters into the suction shaft 24 there is provided, as shown in Figure 4, a cooler 41 through which the engine oil is conducted by means of a pipe 42, 43.

The exhaust pipe 44 for the one row of the two rows of cylinders of the engine is connected by a cross pipe 45 arranged in front of the cylinders to the exhaust pipe 46 belonging to the second row of cylinders. The exhaust gases are only conducted from the rear end of the pipe 46 through the pipe 47 to the silencer 48. The rear end of the pipe 44 is closed but an extension pipe 49 is connected to it which, in conjunction with the pipe 47, serves to carry the silencer independently of the body of the vehicle.

The connecting pipe 45 is carried through a heat exchange apparatus 50. This heat exchange apparatus may consist of a jacket which is closed at the ends and surrounds the pipe 45. Air from a blower 8 is introduced into the interior of this jacket through a pipe 51 and, after being suitably warmed, is conducted through a pipe 52 in the interior of the body of the vehicle which is to be warmed.

The invention is, of course, not limited to the details described and illustrated. In particular, the features shown can be employed for other forms of construction and arrangement of the engine and vehicle body and so forth.

I claim:—

In an internal combustion engine, a crank case, two rows of cylinders connected with the crank case, the rows being arranged in V-formation, two air blowers each of them being arranged in the outer angle formed by one side wall of the crank case and the row of cylinders at a point laterally offset from the walls of the crank case and positioned for conducting the air from the fans to the different cylinders of the respective banks transversely from the outside inwardly without any sudden change of direction, and conducting the air upwardly to the cylinders, whereby the heated air assists in movement of the air in the desired direction because of the natural force of convection possessed by heated air.

H. LEDWINKA.